July 4, 1967     E. GROSSO     3,329,077
AIR CONDITIONING ON MOTOR VEHICLES
Filed Oct. 25, 1965     3 Sheets-Sheet 1
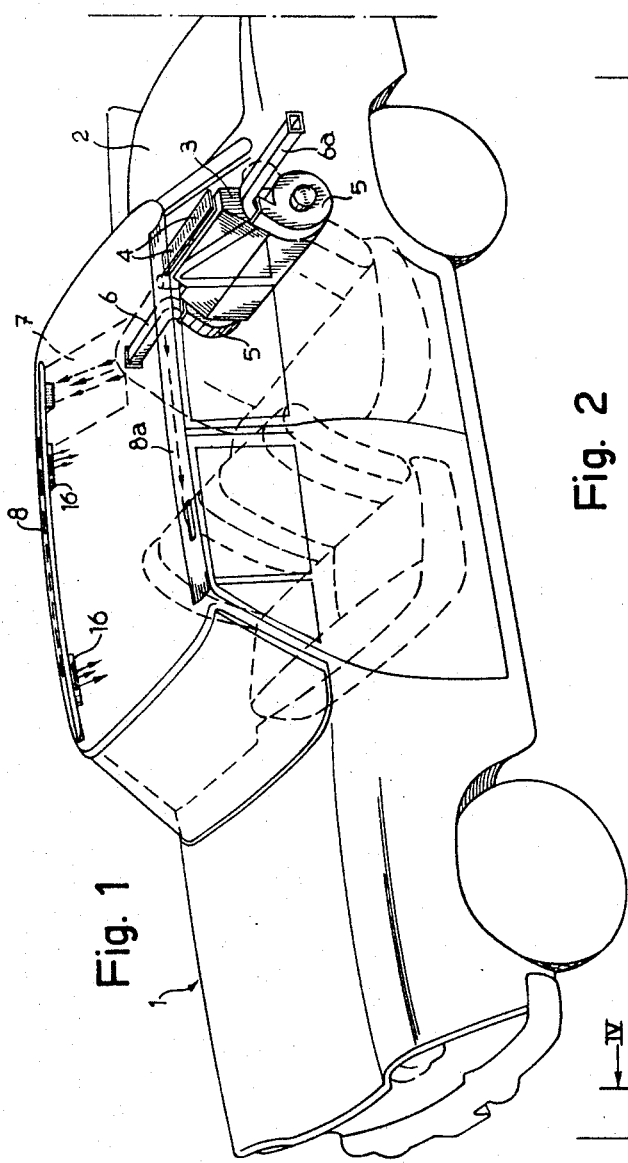
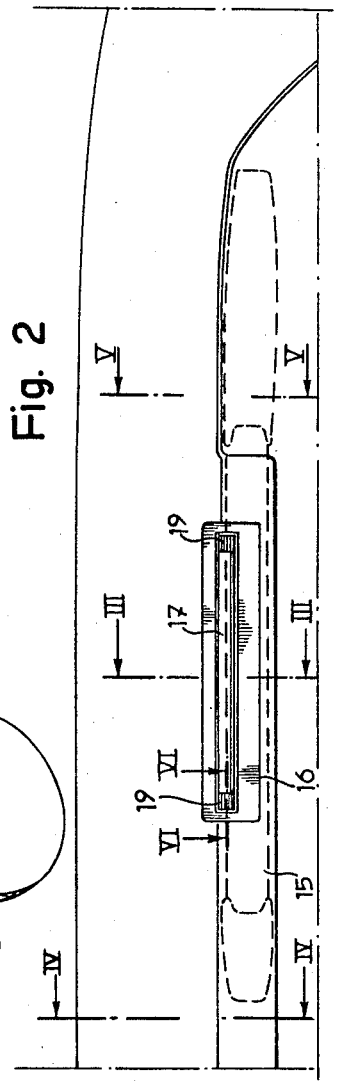

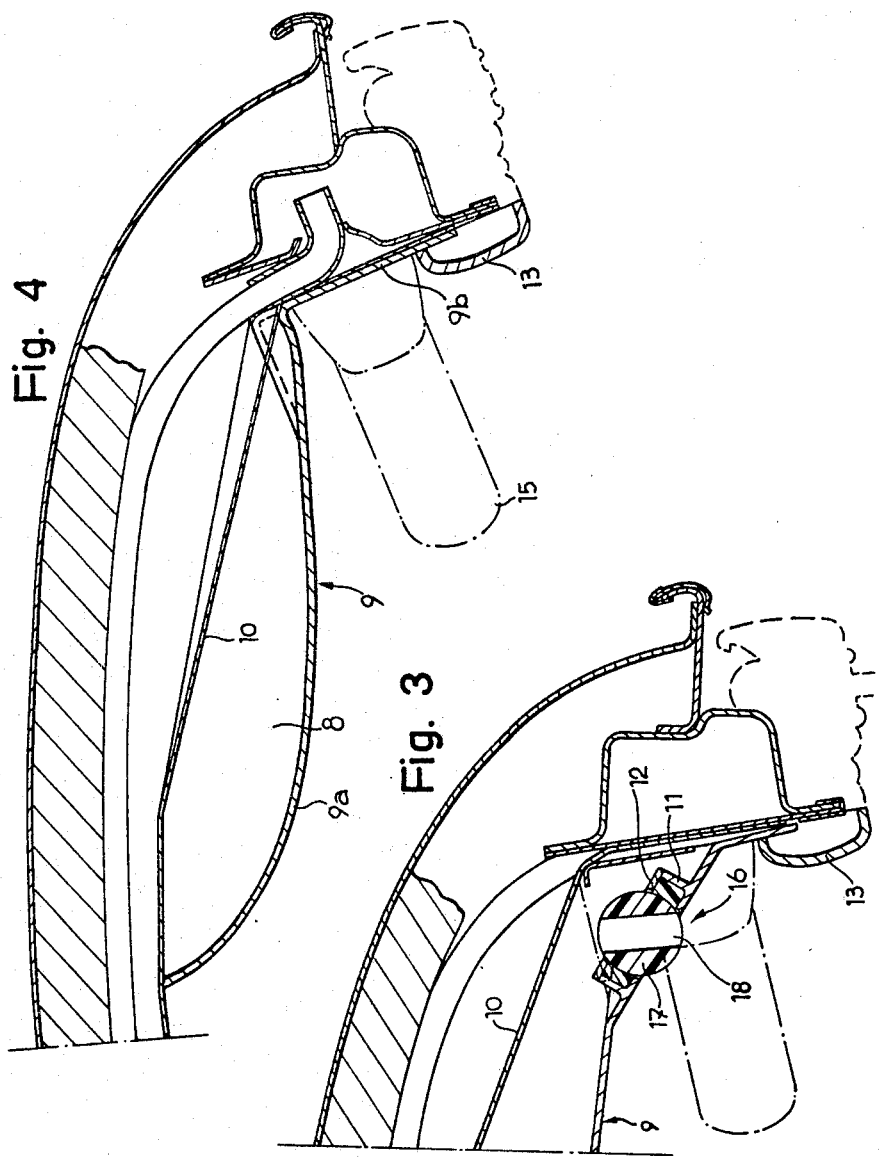

United States Patent Office 3,329,077
Patented July 4, 1967

3,329,077
AIR CONDITIONING ON MOTOR VEHICLES
Edoardo Grosso, Turin, Italy, assignor to Fiat Societa per Azioni, Turin, Italy
Filed Oct. 25, 1965, Ser. No. 505,163
Claims priority, application Italy, Nov. 3, 1964, 6,094/64
3 Claims. (Cl. 98—2)

ABSTRACT OF THE DISCLOSURE

An arrangement for delivery of conditioned air to the passenger compartment of a vehicle through valve controlled outlets of rectangular shape provided in the channel-shaped members defining with the inner surface of the roof two longitudinally extending conduits arranged at the side edges of said roof and each communicating with a hollow upstanding member of the rear part of the vehicle body, connected in turn with a heat exchanger arranged beneath the rear window of the compartment.

This invention relates to an improved arrangement for delivering conditioned air to the passenger compartment of a motor vehicle.

Known air conditioning units adapted for installation on motor vehicles for conditioning the air in the passenger compartment in the vehicle body comprise a heat exchanger arranged at the front or rear portion of the passenger compartment and outlets for the treated air situated in close proximity to the heat exchanger, e.g., an evaporator.

Consequently, the effects of air conditioning are mostly felt at the region of the passenger compartment situated near the heat exchanger. For instance, if the heat exchanger is arranged beneath the instrument board, the passengers occupying the front seats are exposed to a bothersome air-blast. In addition, the necessity of increasing air delivery from the conditioning unit in order to offer benefit thereof to the passengers occupying the rear seats increases the discomfort of the passengers nearer the heat exchanger.

A similar inconvenience arises when the heat exchanger is arranged at the rear region of the passenger compartment.

This invention obviates the above drawbacks by providing an arrangement which uniformly delivers conditioned air throughout the passenger compartment of a motor vehicle, and can be easily installed even on existing vehicles.

The arrangement comprises two longitudinal conduits extending throughout the length of the passenger compartment along the side edges of the inner roof surface and provided with adjustable air outlets to the compartment, the two conduits being connected with the outlets for the treated air from the heat exchanger installed on the vehicle.

Further characteristic features and advantages will be understood from the appended description of an embodiment shown by way of example on the accompanying drawings, wherein:

FIGURE 1 is a perspective transparent view of a motor vehicle provided with an arrangement for delivering conditioned air according to this invention;

FIGURE 2 is a part side view on an enlarged scale of a conduit arranged along the vehicle roof, and FIGURES 3, 4 and 5 are part sectional views on lines III—III, IV—IV and V—V of FIGURE 2.

Figure 5:
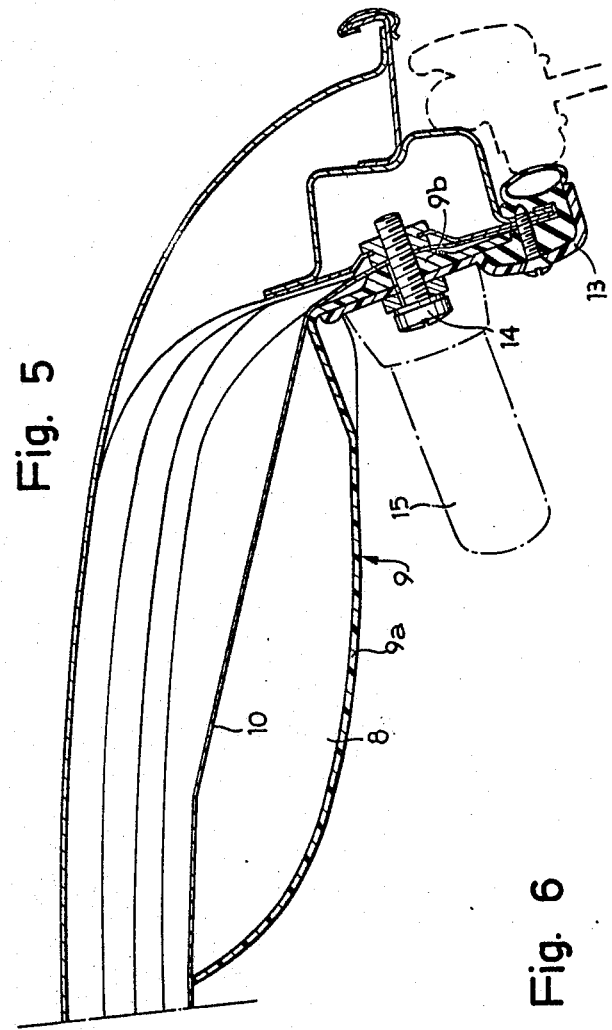
Figure 6:
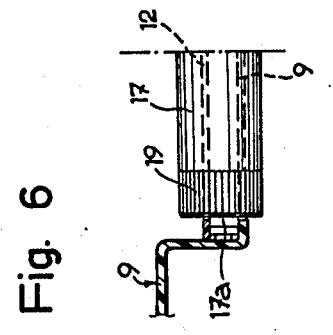
FIGURE 6 is a part sectional view of an air outlet on line VI—VI of FIGURE 2.

Referring to FIGURE 1, a motor vehicle body 1 has a heat exchanger 3 arranged in a space 2 behind the rear seat, the heat exchanger 3 being an evaporator secured to the vehicle body and connected with a compressor-condenser unit of known type, not shown, arranged at another region of the vehicle such as in front of the passenger compartment.

The heat exchanger 3 is provided at the top with air inlets 4 flush with the sill of the rear window and with laterally arranged fans 5 adapted to draw air from the passenger compartment through the inlets 4 and convey it through the heat exchanger to the delivery conduits.

A plurality of conduits deliver air from the heat exchanger 3 throughout the length of the passenger compartment. Conduits 6, 6a lead from the outlets from the fans 5 of the heat exchangers to conduits 7, 7a, respectively, formed by the rear uprights of the vehicle body which are made hollow from box-shaped pressed sheet metal.

The conditioned air is delivered from the uprights 7, 7a to two conduits 8, 8a extending along the inside edges of the vehicle roof and provided with air outlets.

In the embodiment shown the conduits 8, 8a each comprise a channel 9 having a curved portion 9a and a flat portion 9b for attachment of the channel to the vehicle roof.

On assembly the flat portion 9b of the channel 9 is interposed between the inner roof face and a covering strip 13 fixing a lining 10 to the inner roof surface.

On assembly the curved portion 9a of the channel 9 has its concave side turned upwardly to define with the roof portion covered thereby a longitudinal conduit 8 adapted to convey the air flow throughout the length of the passenger compartment.

The free edge of the curved portion 9a of the channel 9 which is preferably made of plastic material adheres to the lining 10 by virtue of its own elasticity.

The channel 9 is fastened to the roof by the strip 13 and additionally by means of screws 14 which secure to the roof structure straps 15 with which the vehicle is usually provided.

The channels 9 forming the side conduits extending along the vehicle roof are each provided with at least two air outlets 16. The outlets 16 are each provided with an adjustment valve comprising a cylinder 17 formed with a diametrical slit 18—and is rotatably supported from the channel 9 by two pins 17a coaxial with the cylinder 17.

A valve seat for the cylinder valve is formed by a box structure comprising side walls 11 fast with the channel 9 and a cover 12 provided with an opening similar to the outlet 16.

The free space between the side walls 11 and the cylinder 17 are filled with a suitable packing material to prevent flow of air along the cylinder sides.

The cylinder 17 is knurled at its end portions 19 to facilitate grip by the fingers for rotating the cylinder and directing the air stream issuing from the slit 18.

The longitudinal bottom members extending beneath the vehicle doors can also be utilized according to this invention as auxiliary channels for the flow of the conditioned air together or instead of the top conduits formed by the channels 9.

The device for delivering conditioned air according to this invention uniformly distributes the air flow from the heat exchanger 3 throughout the passenger compartment, eliminating local blasts occurring with conventional devices.

By means of the adjustable valves with which the outlets are provided the flow of conditioned air can be properly directed to avoid any bother to nearby passengers.

It will be clear that the device according to this invention is simple and inexpensive to manufacture and can easily be installed on existing vehicles, though the latter may not be arranged for installation of air conditioners.

While the embodiments of the present invention as herein disclosed constitutes a preferred form, it is to be understood that other forms might be adopted without departing from the scope of the appended claims.

What I claim is:

1. An arrangement for delivering conditioned air to the passenger compartment in a motor vehicle body compising a heat exchanger secured to the vehicle body having two outlets for the treated air, two longitudinal conduits extending internally throughout the length of the passenger compartment along the side edges of the inner roof surface and provided with adjustable outlets for admitting air to the passenger compartment, the two longitudinal conduits each formed by a portion of the inner wall of the roof of the passenger compartment and a shaped channel arranged along the roof side, the conduits being each connected with one air outlet from the evaporator.

2. An arrangement as claimed in claim 1, wherein the shaped channels forming the conduits are secured to the vehicle body by longitudinal strips fastened to the roof.

3. An arrangement as claimed in claim 1, wherein the adjustable outlets include rectangular openings provided in the channels and adjustable valves in the form of rotatable cylinders formed with diametrical slits and knurled end portions rotatable in the openings.

References Cited
UNITED STATES PATENTS

| | | | |
|---|---|---|---|
| 2,714,808 | 8/1955 | Owen | 62—244 X |
| 2,730,866 | 1/1956 | Baker | 62—244 X |
| 2,747,495 | 5/1956 | Muller | 62—244 X |
| 2,804,756 | 9/1957 | Faulhaker | 62—244 X |

MEYER PERLIN, *Primary Examiner.*